United States Patent [19]
Dyott

[11] 4,307,938
[45] Dec. 29, 1981

[54] DIELECTRIC WAVEGUIDE WITH ELONGATE CROSS-SECTION

[75] Inventor: Richard B. Dyott, Orland Park, Ill.
[73] Assignee: Andrew Corporation, Orland Park, Ill.
[21] Appl. No.: 126,416
[22] Filed: Mar. 3, 1980

[30] Foreign Application Priority Data

Jun. 19, 1979 [GB] United Kingdom ............... 21308/79

[51] Int. Cl.³ ............................................. G02B 5/172
[52] U.S. Cl. .................................................. 350/96.30
[58] Field of Search ............... 350/96.15, 96.16, 96.30, 350/96.31, 96.32, 96.34

[56] References Cited

U.S. PATENT DOCUMENTS

| | | | |
|---|---|---|---|
| 3,813,141 | 5/1974 | Miller | 350/96.30 |
| 3,887,264 | 6/1975 | Kompfner | 350/96.31 |
| 4,046,537 | 9/1977 | Deserno et al. | 65/2 |
| 4,106,847 | 8/1978 | Arnaud | 350/96.31 |
| 4,179,189 | 12/1979 | Kaminow et al. | 350/96.30 X |
| 4,274,854 | 6/1981 | Pleibel et al. | 350/96.30 X |

FOREIGN PATENT DOCUMENTS 2012983  8/1979 United Kingdom .

OTHER PUBLICATIONS

Yeh, "Elliptical Dielectric Waveguides", *Journal of Applied Physics*, vol. 33, No. 11, Nov. 1962, pp. 3235-3243.
Ramaswamy et al., "Polarization Characteristics of Noncircular Core Single-Mode Fibers", *Appl. Optics*, vol. 17, No. 18, Sep. 1978, pp. 3014-3017.
Adams et al., "Birefringence in Optical Fibers with Elliptical Cross-Section", *Electronics Lett.*, vol. 15, No. 10, May 1979, pp. 298-299.
Doytt et al., "Preservation of Polarisation in Optical-Fibre Wavefguides with Elliptical Cores", *Electronics Lett.*, vol. 15, No. 13, Jun. 1979, pp. 380-382.
Cozens et al., "Higher-Mode Cutoff in Elliptical Dielectric Waveguides", *Electronics Lett.*, vol. 15, No. 18, Aug. 1979, pp. 558-559.
Tsuchiya et al., "Characteristics of Single-Mode Optical Fiber with Elliptical Core", [In Japanese, No Journal Name, No Date], pp. 21-30.

*Primary Examiner*—John D. Lee
*Attorney, Agent, or Firm*—Leydig, Voit, Osann, Mayer & Holt, Ltd.

[57] ABSTRACT

A dielectric waveguide comprises a wave propagating member having a core with a refractive index $n_1$ and a cladding with a refractive index $n_2$, the core having an elongate cross-section with a major axis a and a minor axis b. The values of $n_1$, $n_2$, a and b are such that only the two orthogonally polarized fundamental modes of a wave with a prescribed wavelength can propagate through the core, thereby avoiding propagation of unwanted higher order modes of the wave, and such that the group velocities of the two orthogonally polarized fundamental modes are substantially equal so that any accidental coupling between the fundamental modes does not reduce the bandwidth of the waveguide.

8 Claims, 9 Drawing Figures

DIELECTRIC WAVEGUIDE WITH ELONGATE CROSS-SECTION

DESCRIPTION OF THE INVENTION

The present invention relates to dielectric waveguides, such as optical fiber waveguides which are used to propagate electromagnetic waves having wavelengths within the visible spectrum or the waveband used for optical signals in communication systems.

As is well known, optical fibers having cores of elliptical cross section have good polarization holding properties when the difference $\Delta n$ between the refractive indices $n_1$ and $n_2$ of the fiber core and cladding, respectively, is relatively large. This large $\Delta n$ can maximize the difference $\Delta \beta$ between the propagation constants $\beta_L$ and $\beta_S$ of the two fundamental modes of the signal propagated along the major (long) and minor (short) axes of the elliptical cross section, and the maximum $\Delta \beta$ in turn minimizes coupling between the two fundamental modes. Thus, an optical wave launched into such a fiber in the fundamental mode having the electric field substantially parallel to the major axis of the ellipse can be reliably picked up by polarization sensitive devices at the other end of the fiber.

Such a wave is theoretically propagated along the major axis of the ellipse in a single mode, but in actual practice it is difficult to attain perfect alignment of the wave source and the major axis of the ellipse. Consequently, the wave is propagated in two orthogonally polarized fundamental modes aligned with both the major and minor axes of the ellipse. The elliptical configuration of the fiber core tends to hold these two fundamental modes in alignment with the respective axes of the ellipse along the entire length of the fiber.

Another known characteristic of optical fibers with elliptical cores is that the maximum difference $\Delta \beta$ between the propagation constants $\beta_L$ and $\beta_S$ of the two orthogonally polarized fundamental modes occurs in the region where the unwanted higher order modes are cut off. (Unlike the higher order modes the fundamental modes have no lower frequency cutoff.) As already mentioned, operation at maximum $\Delta \beta$ minimizes coupling between the two fundamental modes to preserve good polarization of the signal. However, even then accidental coupling between the two fundamental modes still tends to reduce the bandwidth of the waveguide.

Accordingly, it is a primary object of the present invention to provide an elliptical-core optical fiber, or other dielectric waveguide of elongate cross section, which virtually eliminates any adverse effect from unwanted coupling between the two orthogonally polarized fundamental modes of the transmitted signal while operating in the region where the higher order modes are cut off. Thus, one specific object of the invention is to provide such a dielectric waveguide which avoids any reduction in the bandwidth of the waveguide due to unwanted coupling between the two fundamental modes.

Another important object of the invention is to provide an elliptical-core optical fiber of the foregoing type which can be efficiently and economically manufactured at high production rates.

Other objects and advantages of the invention will be apparent from the following detailed description.

The present invention satisfies the foregoing objectives by providing an elliptical-core optical fiber, or other dielectric waveguide of elongate cross section, which equalizes the group velocities of the two orthogonally polarized fundamental modes of a signal propagated therethrough while operating in the region where the higher order modes are cut off. As long as these group velocities are equal, any accidental coupling between the two fundamental modes is unimportant because the signals carried by the two fundamental modes will arrive simultaneously at the end of the optical fiber or dielectric waveguide. As a result, there is no reduction in the bandwidth of the waveguide due to the accidental coupling.

The invention stems in part from the discovery that an elliptical-core optical fiber can be made to operate in a region in which higher order modes are cut off, while at the same time equalizing the group velocities of the two orthogonally polarized fundamental modes. It was previously known that the difference between the propagation constants and the phase velocities of the two fundamental modes could be maximized in the region in which higher order modes are cut off, but it was believed that the group velocities—like the propagation constants and the phase velocities—of the fundamental modes would be dissimilar in that region. Although it is true that for all ratios of major to minor axes there is a point where the group velocities of the two fundamental modes are equal, it is only when the ratio exceeds a certain value that this point occurs below the higher mode cut-off, i.e., in the region where only the two fundamental modes can propagate. Consequently, it is possible to choose an operating point such that the coupling between the two fundamental modes can be made small (by having the difference in phase velocities large) while at the same time rendering insignificant (by equalizing the group velocities) any accidental coupling between the fundamental modes.

As a result of this invention, an elliptical-core optical fiber can be made to provide not only excellent preservation of polarization of the transmitted signal in an operating region in which higher order modes of the signal are cut off, but also equal group velocities of the two fundamental modes of the transmitted signal. The end result of this combination of characteristics is that optical signals within a wide bandwidth can be transmitted through long lengths of optical fibers and then picked up by polarization sensitive detectors. Thus, the optical fibers provided by this invention are particularly useful for long-distance communication systems, or other applications where it is important to have a highly polarized signal which can be reliably detected and, if necessary, re-transmitted.

Exemplary embodiments of the invention will now be described with reference to the accompanying drawings, in which.

Figure 1:
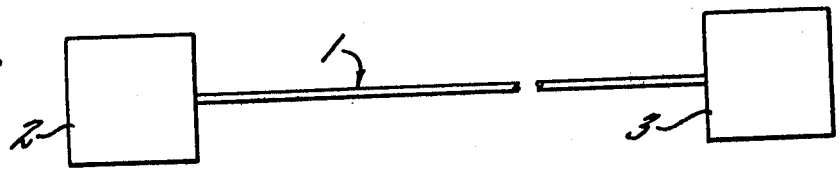
FIG. 1 is a schematic diagram of a single communication system incorporating a dielectric waveguide embodying the invention.
Figure 2:
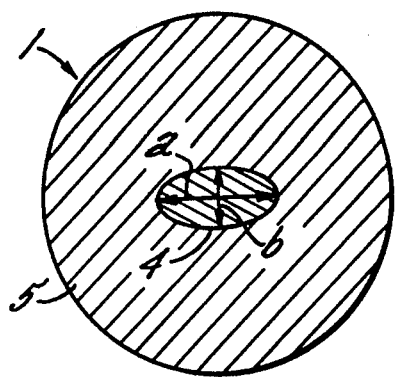
FIG. 2 is a cross-section of a preferred optical fiber for use as the dielectric waveguide in the system shown in FIG. 1.

Referring first to FIGS. 1 and 2, the illustrative communication system comprises an optical fiber waveguide 1 which extends between a source 2 of polarized electromagnetic radiation having a wavelength in the visible spectrum and a polarization sensitive detector 3. As shown in FIG. 2, the optical fiber waveguide 1 comprises a wave propagating member or core 4 of elliptical cross-section surrounded by a dielectric cladding 5. The elliptical cross-section of the core 4 has a major axis a of a length which is substantially 2.5 times the length of the minor axis b, i.e., the ratio $a/b=2.5$.

The core 4 is preferably formed by a vapor deposition process in which suitable doping materials such as the oxides of germanium and phosphorus are deposited on the inner surface of a silica tube which is then collapsed to form a solid rod which constitutes the doped core 4 of a surrounding silica cladding 5. The silica rod is then drawn down until the core 4 and cladding 5 are reduced to the desired dimensions. The elliptical core may be formed by abrading diametrically opposed portions of the outside surface of the silica tube, before it is collapsed and drawn, to form a pair of flat lands diametrically opposed to each other and extending continuously along the length of the tube.

Figure 3:
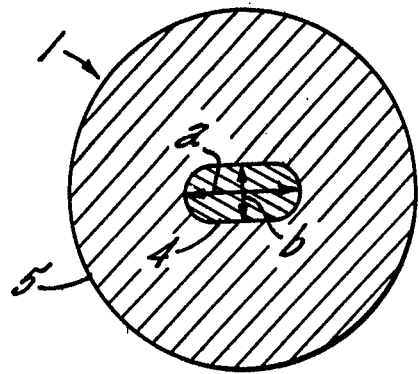
FIGS. 3 through 5 are cross-sections of three alternative forms of optical fibers for use as the dielectric waveguide in the system shown in FIG. 1.
Figure 4:
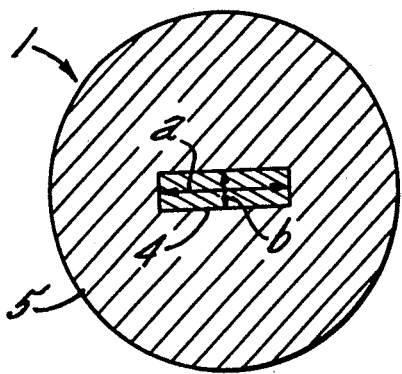
Figure 5:
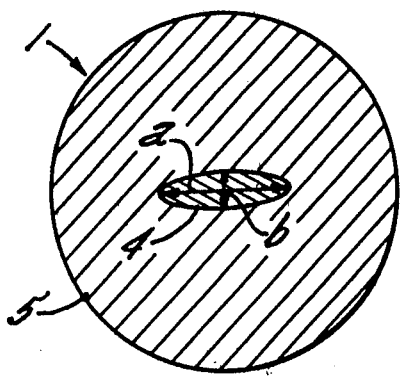
Figure 6:
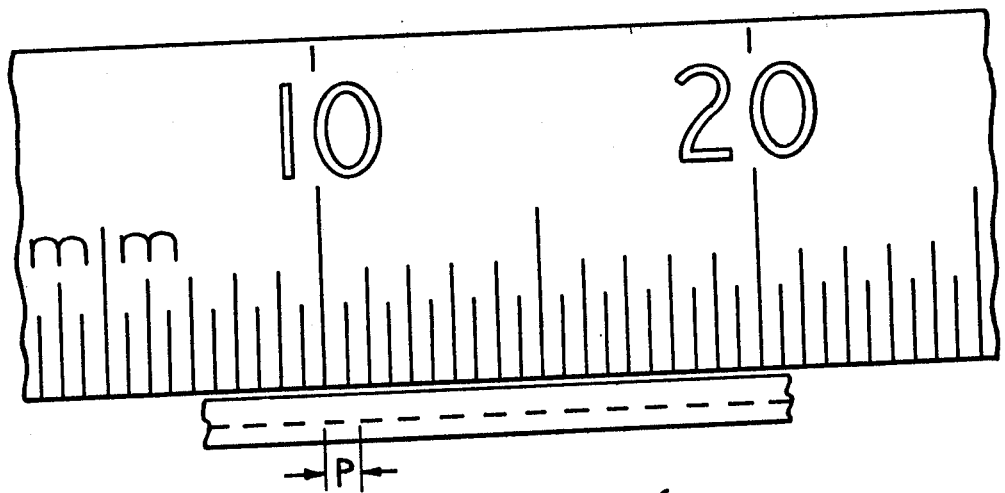
FIG. 6 is a schematic illustration of the modal beat pattern (represented by the horizontal broken line) of scattered light from the optical fiber of FIG. 2 when circularly polarized light is launched into the fiber.

In an alternative form of the core 4 illustrated in FIG. 3, the elongate cross-section is substantially oval and the ratio of the length of the major axis a to the length of the minor axis b is $a/b=2.5$. In yet another form of the core 4 illustrated in FIG. 4, the elongate cross-section is substantially rectangular and the ratio of the length of the major axis a to the length of the minor axis b is $a/b=3.0$. In a further form of the core 4 illustrated in FIG. 5, the elongate cross-section is again elliptical, but in this case the ratio of the length of the major axis a to the length of the minor axis b is $a/b=3.5$.

In use of the communication system illustrated in FIG. 1, a polarized electromagnetic wave is applied by the source 2 as an input to the optical waveguide 1, so that the direction of polarization is aligned with the major axis a, is propagated by the waveguide 1, and is received by the detector 3 without any significant change in the direction of polarization relative to the axes a and b. The preservation of the direction of polarization of the propagated wave is a characteristic of the wave propagating member or core 4.

Figure 8:
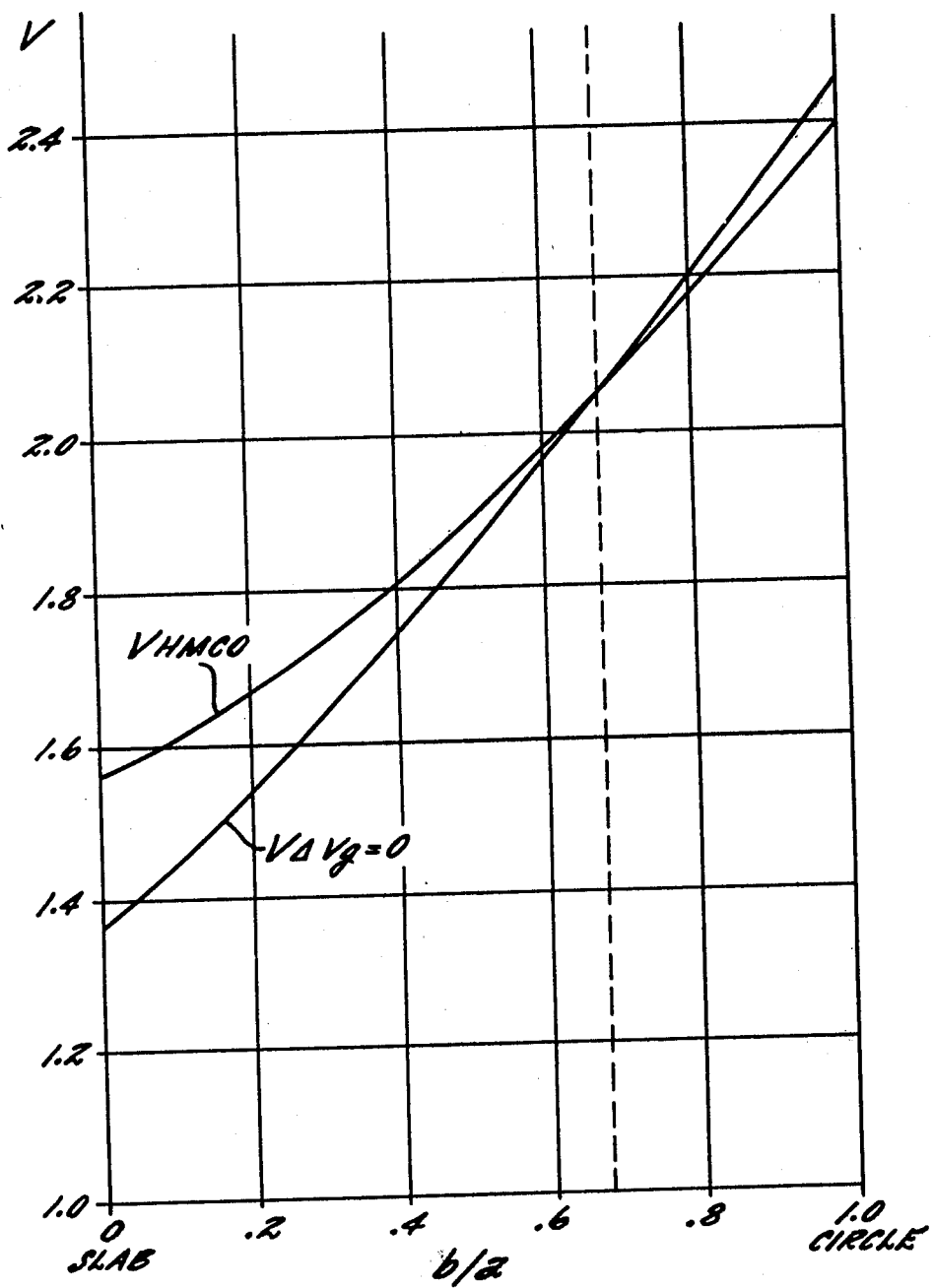
FIG. 8 is a graph showing the parameter V plotted against the ratio b/a for different operating conditions in the fiber of FIG. 2.
Figure 9:
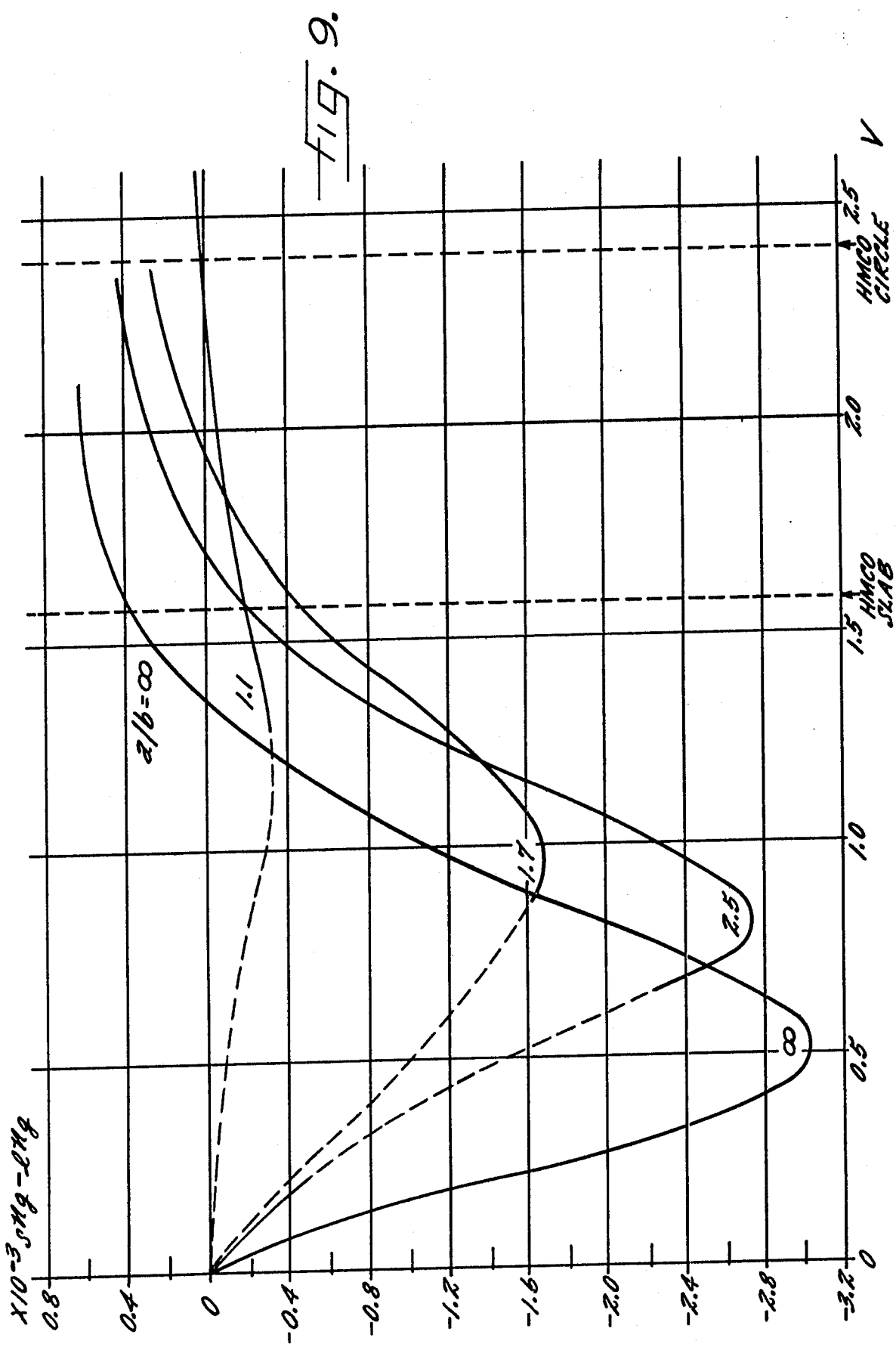
FIG. 9 is a graph showing the difference $\Delta n_g$ in the group indices of the two fundamental modes plotted against the parameter V for cores of various elliptical cross-sections in the fiber of FIG. 2.

For any given set of values for the signal wavelength and the refractive indices of the core and cladding, the elongate cross section of the core 4 must be dimensioned to ensure that higher modes of the optical signal will be cut off. This is essential to maintain a maximum bandwidth for the waveguide. The particular parameter that is normally used to determine whether or not a given set of properties will result in higher mode cutoff is "V", which is defined as:

$$V = \frac{\pi b}{\lambda_o} [n_1^2 - n_2^2]^{\frac{1}{2}}$$

where
$n_1$ = index of refraction of core
$n_2$ = index of refraction of cladding
$\lambda_0$ = free space wavelength FIG. 8 shows the higher mode cutoff ("HMCO") values of this parameter V at different values of the b/a ratio for an optical fiber having an elliptical core $n_1=1.535$, and $n_2=1.47$. Only the two fundamental modes of the signal can be propagated through such a fiber as long as V has a value below the $V_{HMCO}$ curve at any given value of the ratio b/a.

In keeping with the invention, the dimensions of the elliptical cross section of the core are chosen to provide a b/a ratio that permits V to have a value that is not only below the higher mode cutoff value ($V_{HMCO}$), but also produces equal group velocities for the two fundamental modes ($V_{\Delta vg=0}$). The values of the parameter V that provide these equal group velocities at different b/a values in the particular fiber described above are given by the curve $V_{\Delta vg=0}$ in FIG. 8. It can be seen that at b/a values above about 0.67, a/b=1.54, equal group velocities can be attained only at V values above the higher mode cutoff level, i.e., the $V_{\Delta vg=0}$ curve is above the $V_{HMCO}$ curve. At b/a values below 0.67, however, the $V_{\Delta vg=0}$ curve drops below the $V_{HMCO}$ curve so that equal group velocities can be attained along with higher mode cutoff. Thus, with the proper values for b/a and V, the dielectric waveguide can provide both higher mode cutoff and equal group velocities for the two fundamental modes. For example, referring to FIG. 8, b/a might be selected to have a value of 0.40 (a/b=2.5), at which value V should be 1.74 in order to provide equal group velocities, V for higher mode cutoff being at the greater value of 1.81. Having thus determined the value of V, the value of b can be determined from the equation:

$$V = \frac{\pi b}{\lambda_o} [n_1^2 - n_2^2]^{\frac{1}{2}}$$

Using the values for $n_1$ and $n_2$ used previously:
and at a wavelength $\alpha_0$ of 1500 nanometers.

$$1.74 = \frac{\pi b}{1500 \times 10^{-9}} [(1.535)^2 - (1.47)^2]^{\frac{1}{2}}$$

$$b = \frac{(1.74)(1500 \times 10^{-9})}{\pi [(1.535)^2 - (1.47^2)]^{\frac{1}{2}}}$$

$$= 1.88 \times 10^{-6} m.$$

Since a/b was originally selected to be 2.5,
$a = 2.5 b$
$= (2.5)(1.88 \times 10^{-6})$
$= 4.7 \times 10^{-6}$ m.

The values for the $V_{vg=0}$ curve in FIG. 8 can be determined by using the transcendental equation for elliptical core fibers. The characteristic equation for elliptical dielectric guides can be presented in a form exactly analogous with that commonly used to describe guides with circular cross-sections. For even modes (i.e., those where the axial H-field is described by an even radial Mathieu function) we can write:

$$\left(\left(\frac{\epsilon_1}{\epsilon_2}\right)\frac{w^2}{u}\frac{S'e_m}{Se_m}+\frac{wG'ek_m}{Gek_m}\right)\left(\frac{w^2}{u}\frac{C e_m}{Ce_m}+\frac{wF'ek_m}{Fek_m}\right)=\left[\frac{\beta m k_2 b^2}{4u^2}\left(\frac{\epsilon_1}{\epsilon_2}-1\right)\right]^2$$

where $\epsilon_1$ is the dielectric constant of the core, $\epsilon_2$ is the dielectric constant of the cladding, $\beta$ is the modal propagation constant and $k_2$ is the cladding wave number, u and w are defined as for the circular guide using the semiminor axis b/2 as the equivalent radius. $Se_m$, $Ce_m$, $Gek_m$, $Fek_m$ represent Mathieu functions, and the derivatives of $Se_m$, $Ce_m$ are taken with respect to u(cosh $\xi$/sinh $\xi_o$) and of $Gek_m$, $Fek_m$ with respect to w(cosh $\xi$/sinh $\xi_o$), where $\xi_o=\coth^{-1}(a/b)$.

The characteristic equation for the odd modes can be found by merely interchanging $Se_m$ and $Ce_m$, $Gek_m$ and $Fek_m$. The differential $d\omega/d\beta$ (where $\omega$ is the radian frequency $2\pi f=2\pi c/\lambda_o$) is the group velocity vg of the particular mode represented by the other values in the equation. Thus, when the group velocities $v_{gL}$ and $v_{gS}$ of the two fundamental modes are equal, the two differentials $d\omega/d\beta_L$ and $d\omega/d\beta_S$ are equal. The equation $d\omega/d\beta_L = d\omega/d\beta_S$ can then be solved for b, and the resulting value of b can be used to determine the value of V using the standard equation for V as set forth above.

Figure 7:
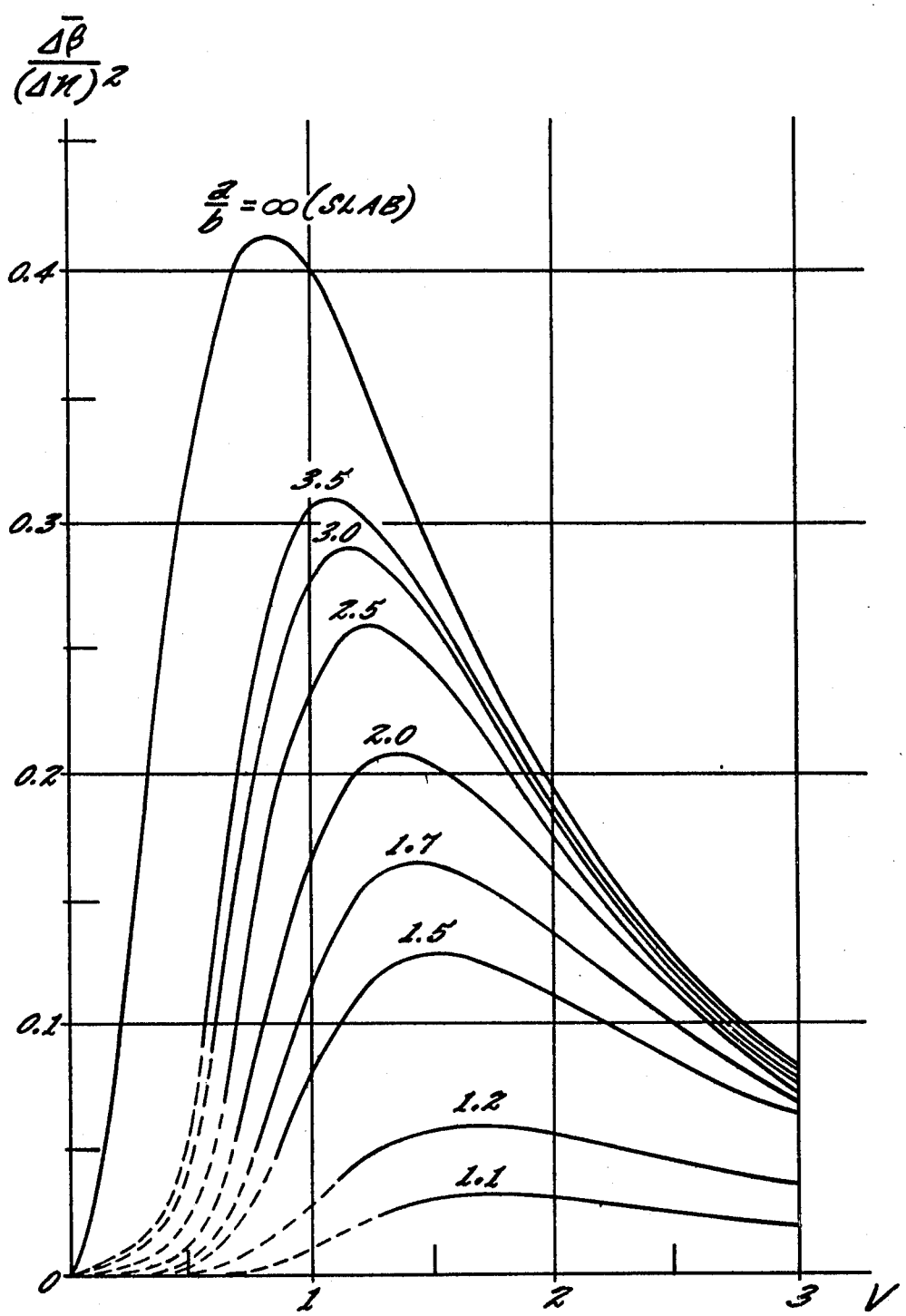
FIG. 7 is a graph showing $\Delta\beta/(\Delta n)^2$ plotted against the parameter V for cores of various elliptical cross-sections in the fiber of FIG. 2.

As can also be seen from FIGS. 7 and 8, the V value at which the maximum $\Delta\beta$ is achieved is always lower than the V value at which equal group velocities are achieved. Thus equal group velocities and maximum $\Delta\beta$ cannot both be attained at the same time in a given fiber. However, although $\Delta\beta$ cannot be maximized, it can still be made quite large to inhibit coupling between the two fundamental modes. This can be seen most clearly in FIG. 7, which illustrates the variations in $\Delta\beta/(\Delta n)^2$ as a function of V, for different a/b ratios. In the case of the fiber just described, V = 1.74 to equalize the group velocities and $a/b=2.5$, it can be seen from FIG. 7 that $\Delta\beta/(\Delta n)^2$ will not be at its peak value of 0.255 but will still have the relatively large value of 0.215 (84% of maximum). The coupling between the two fundamental modes in this fiber is less than $-40$ dB at an operating wavelength of 633 nanometers when a complete turn of the fiber is wound round a rod 2 mm in diameter. As long as the group velocities of the fundamental modes are equalized, a small amount of coupling between the fundamental modes is unimportant as far as group delay is concerned; i.e., the two fundamental modes of the transmitted signal will arrive at the signal receiver at the same time, so there is no reduction in the bandwidth of the dielectric waveguide.

I claim as my invention:

1. A dielectric waveguide comprising a wave propagating member having a core with a refractive index $n_1$ and a cladding with a refractive index $n_2$, said core having an elongate cross section with a major axis a and a minor axis b, the values of $n_1$, $n_2$, a and b being such that
   (1) only the two orthogonally polarized fundamental modes of a wave with a prescribed wavelength can propagate through said core, thereby avoiding propagation of unwanted higher order modes of said wave and
   (2) the group velocities of said two orthogonally polarized fundamental modes are substantially equal so that any accidental coupling between said fundamental modes does not reduce the bandwidth of the waveguide.

2. A dielectric waveguide as set forth in claim 1 wherein the propagation constants of said fundamental modes are substantially different so as to minimize coupling therebetween.

3. A dielectric waveguide as set forth in claim 1 wherein said wave propagating member is an optical fiber having a core with an elliptical cross section.

4. A dielectric waveguide as set forth in claim 1 wherein the ratio of the length of the major axis to the length of the minor axis of said elongate cross-section is in the range of from about 2.0 to about 3.5.

5. A method of propagating electromagnetic waves along a dielectric waveguide, said method comprising the steps of applying the polarized electromagnetic wave as an input to a wave propagating member having a core with a refractive index $n_1$ and a cladding with a refractive index $n_2$, said core having an elongate cross section with a major axis a and a minor axis b, the values of $n_1$, $n_2$, a and b being such that
   (1) only the two orthogonally polarized fundamental modes of a wave with a prescribed wavelength can propagate through said core, thereby avoiding propagation of unwanted higher order modes of said wave and
   (2) the group velocities of said two orthogonally polarized fundamental modes are substantially equal so that any accidental coupling between said fundamental modes not does reduce the bandwidth of the waveguide.

6. A method as set forth in claim 5 wherein the propagation constants of said fundamental modes are substantially different so as to minimize coupling therebetween.

7. A method as set forth in claim 5 wherein said wave propagating member is an optical fiber having a core with an elliptical cross section.

8. A method as set forth in claim 5 wherein the ratio of the length of the major axis to the length of the minor axis of said elongate cross-section is in the range of from about 2.0 to about 3.5.

* * * * *